July 15, 1969

M. T. OLLIFF, JR., ET AL 3,455,579

JOINT FOR PRESSURE VESSELS

Filed July 27, 1967

Martin T. Olliff, Jr. INVENTORS
William R. Puckett
BY
ATTORNEY

July 15, 1969   M. T. OLLIFF, JR., ET AL   3,455,579
JOINT FOR PRESSURE VESSELS

Filed July 27, 1967   3 Sheets-Sheet 2

Martin T. Olliff, Jr. INVENTORS
William R. Puckett

BY

ATTORNEY

July 15, 1969  M. T. OLLIFF, JR., ET AL  3,455,579
JOINT FOR PRESSURE VESSELS
Filed July 27, 1967  3 Sheets-Sheet 3
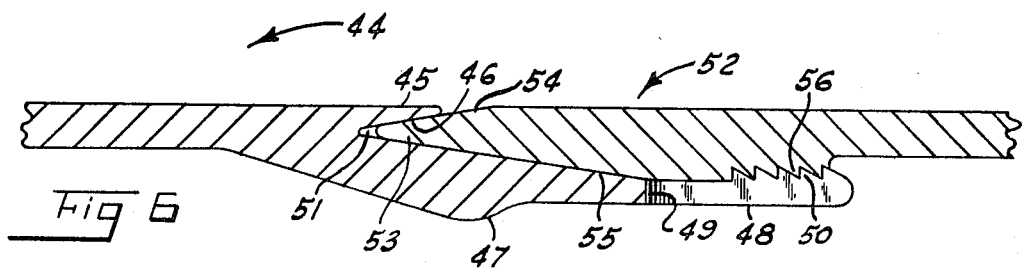
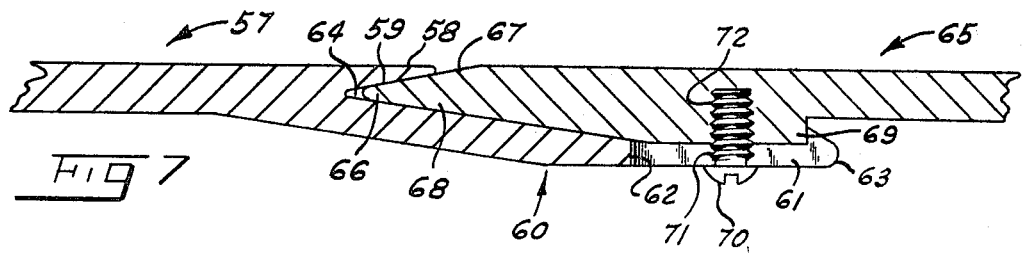
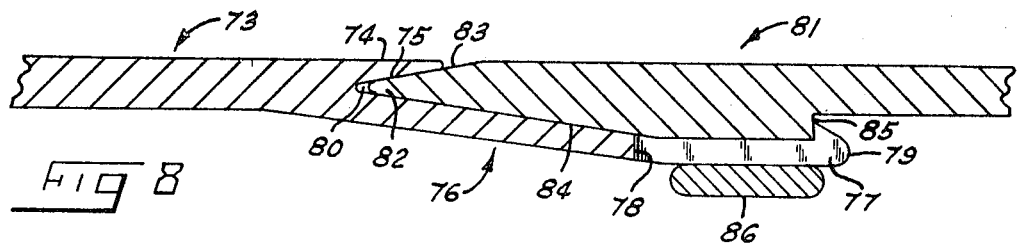
Martin T. Olliff, Jr. INVENTORS
William R. Puckett
BY
ATTORNEY

United States Patent Office 3,455,579
Patented July 15, 1969

3,455,579
JOINT FOR PRESSURE VESSELS
Martin T. Olliff, Jr., Huntsville, and William R. Puckett, Trinity, Ala., assignors to Thiokol Chemical Corporation, Bristol, Pa., a corporation of Delaware
Filed July 27, 1967, Ser. No. 656,577
Int. Cl. F16l 55/00, 35/00; F16j 15/00
U.S. Cl. 285—39                                  1 Claim

ABSTRACT OF THE DISCLOSURE

A self-securing and self-sealing joint for a cylindrical, open-ended pressure vessel that can be used for securing a mating part to either open end of the pressure vessel. The joint includes resilient latch portions on the pressure vessel which engage sear portions on the mating part thereby retaining the mating part in sealing engagement with the pressure vessel. The latch portions may be moved by means of a tool ring containing a fulcrum bolt and a screw bolt.

BACKGROUND OF THE INVENTION

Field of the invention

Because of the pressure that is created in the motor case of a solid propellant rocket motor, it has become common knowledge to refer to the motor case as a pressure vessel and patents have been issued using this nomenclature when referring to such motor cases.

It is also well-known that motor cases for solid propellant rocket motors comprise a cylindrical open-ended body to which is secured at one end a head end and at the opposite end a nozzle. This procedure is followed so that the solid propellant may be positioned in the open-ended body of the motor case in any of many well-known procedures such as casting, extrusion etc. The motor case must have a wall thickness to withstand both radial and longitudinal stress forces and the joint used to connect the head end and the nozzle to the body of the motor case must be strong enough to withstand such forces but without an increase in the thickness of the wall of the motor case that would add additional weight to the motor case or change the center of gravity of the motor case.

Description of the Prior Art

Different types of joints have been utilized to join the head end and the nozzle to the body of the motor case. However, there are some structural features that either render them difficult to manufacture or add additional weight to the motor case. If bolted flanges are used, a precision fit is required so that the holes to receive the bolts are properly aligned so there is no additional stress applied to bolts that are inserted into misaligned holes. Interlocking splines have also been used so that a rotation of the parts are required and a good seal cannoit always be obtained with this type of joint, and a seal is one of the primary requirements for such a joint for a motor case for a solid propellant rocket motor.

SUMMARY OF THE INVENTION

This invention, therefore, relates to a joint for a pressure vessel and more particularly to a joint that is used to join a head end and a nozzle to the opposite ends of a motor case for a solid propellant rocket motor.

It is a well-known fact that pressure in cylindrical pressure vessels causes stresses in the wall of the vessel and particularly so in the walls of motor cases for solid propellant rocket motors. It is the hoop stresses that are greatly magnified in the motor case and it is at the joint that the greatest stress occurs and for this reason in all other joints, than the joint embodying the instant invention, additional material is utilized to withstand such stresses. This additional material, however, is a decided disadvantage, because it not only adds weight to the motor case, but also tends to form discontinuities in the tension field of the motor case.

It is an object of this invention, therefore, to provide a joint for a pressure vessel which does not require a thickening of the wall about the joint.

Another object of this invention is to provide a joint for a pressure vessel that is self-sealing.

A further object of the invention is to provide a joint for a pressure vessel that is simple to construct, economical to manufacture and entirely reliable in securing other formations to the pressure vessel.

The above and other objects and advantages will become more apparent to one skilled in the art, from the following description when taken in conjunction with the accompanying drawings in which:

BRIEF DESCRIPTION OF THE DRAWINGS

FIGURE 6 is a fragmentary sectional view of still another form of the joint embodying the invention;

FIGURE 7 is a fragmentary sectional view of a further form of the joint emodying the invention; and FIGURE 8 is a fragmentary sectional view of a still further form of the joint embodying the invention.

DESCRIPTION OF THE PREFERRED EMBODIMENTS

Figure 1:
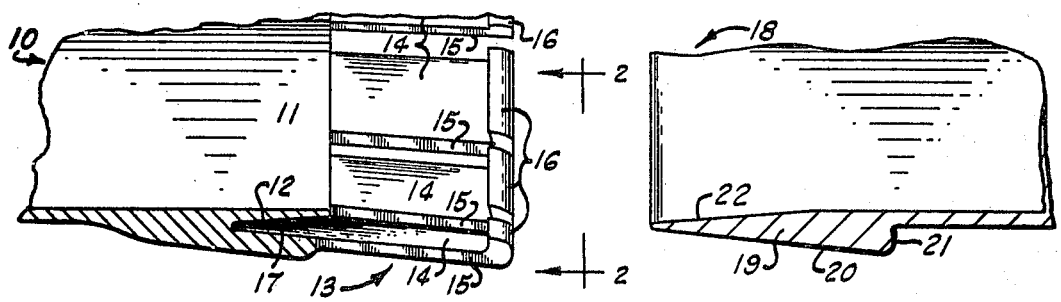
FIGURE 1 is a fragmentary sectional view of one form of the joint embodying the instant invention prior to assembly.
Figure 2:
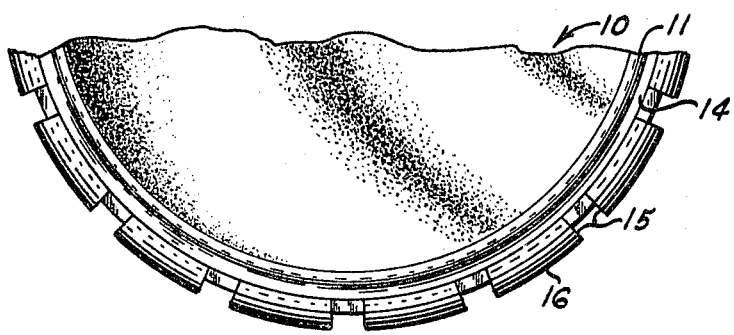
FIGURE 2 is an enlarged fragmentary elevational view taken on the line 2—2 of FIGURE 1.
Figure 3:
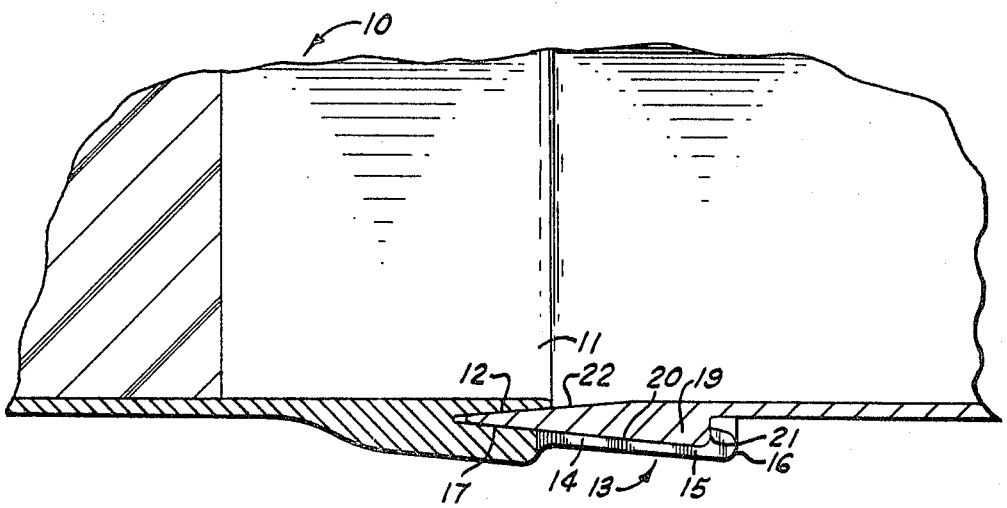
FIGURE 3 is a view similar to FIGURE 1 with the joint assembled.

Referring more in detail to the drawings wherein like parts are designated by like reference numerals, the reference numeral 10, in FIGURES 1 to 3 inclusive, is used to designate a pressure vessel or a motor case body for a solid propellant rocket motor.

The pressure vessel or motor case body 10 is provided with an contiguous mating lip 11 which is bevelled as at 12 and is of the proper thickness that is can be deformed as to internal diameter within the elastic limit of the material used to form the pressure vessel or motor case body 10. A mating latch 13 is also formed on the pressure vessel or motor case body 10 and the latch 13 is also contiguous therewith but extends beyond the edge of the lip 11 for a suitable distance as will be later described.

The latch 13 is divided into segments 14 by a plurality of slits 15 and the outer edge of each segment 14 of the latch 13 is provided with an inturned catch 16 and the latch 13 is separated from the lip 11 by a bevelled kerf 17.

The formation 18, which may be an extension, head end, nozzle or etc., is provided with a mating tongue 19, which is contiguous therewith, has a bevelled outer surface 20 which terminates in an inwardly directed sear 21 and a bevelled inner surface 22.

In assembling this form of the joint embodying the invention, the outer edge of the tongue 19 is forced into the kerf 17 between the bevelled surface 12 of the lip 11 and the latch 13 and the interior diameter of each of the segments 14 will, by the elasticity of the material from which the pressure vessel or motor case body is formed, extend outwardly till it is slightly larger than the outer diameter provided by the bevelled outer surface 20 of the tongue 19. The tongue 19 of the formation 18 is continued to be forced into the latch 13 until each of the catches 16 engage the sear 21, formed on the formation 18, and an interference fit will be obtained between the bevelled surface 12 of the lip 11 and the bevelled surface 22 of the tongue 19 and the engagement of the catches 16 with the sear 21 will securely fasten the formation 18 to the pressure vessel or motor case body 10 with the interference fit providing a sealed joint through the contact of the two surfaces 12 and 22, is previously described.

The length of the slits 15 is long enough to allow deformation of the segments 14 to allow the catches 16 to clear the sears 21 without permanent deformation of the segments 14, thus the total diameter, the modulus of the material used, the diametrical length of contact between the catches 16 and sear 21 and the required thickness of the latch 13 will determine the length of the slits 15 and the distance between the slits 15 that provides the segments 14. Therefore, the relationship of the length of the slits 15 to the length of the segments 14 may vary even to a negative value.

The precise dimensions, angles etc. of the joint must be calculated by normal engineering methods, depending on the materials to be used, and the anticipated pressures that the joint and the pressure vessel or motor case body will need to withstand.

The interior surface of the joint will be protected from heat within the pressure vessel or motor case body by normal insulating methods that are used at the present time and the joint will normally seal itself, as previously described.

It will be understood, therefore, that the formation 18 is joined with the pressure vessel or motor case body 10 by forcing the two together along their longitudinal axis. As the tongue 19 and latch 13 begin to mate, the segments 14 are forced outwardly. Then the surface 22 of the tongue 19 will come into contact with the bevelled surface 12 of the lip 11, causing it to deform inwardly and the segments 14 to deform outwardly until the catches 16 pass the sear 21 at which time the catches 16 will bend inwardly to resume their normal unstressed shape. Force will then be discontinued and the lip will remain permanently stressed to provide a seal between the surface 22 of the tongue 19 and the bevelled surface 12 of the lip 11.

Figure 4:
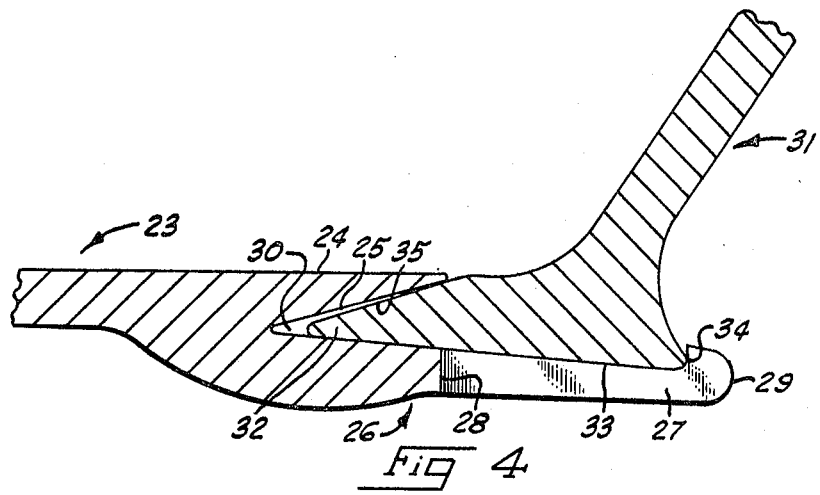
FIGURE 4 is a fragmentary sectional view of another form of the joint embodying the invention.

The form of the invention shown in FIGURE 4 is very similar to the form shown in FIGURES 1 to 3 inclusive, the only difference residing in the formation of the mating portion to be connected by this form of the invention to the pressure vessel or motor case body as will now be described.

The pressure vessel or motor case body 23 is provided with a contiguous mating lip 24 which is beveled at at 25, a mating latch 26 also formed on the pressure vessel or motor case body 23 is also contiguous therewith and extends beyond the edge of the lip 24. The latch 26 is divided into segments 27 by a plurality of slits 28 and the outer edge of the segments 27 is provided with an inturned catch 29 and the latch 26 is separated from the lip 24 by a bevelled kerf 30.

The formation 31 is provided with a mating tongue 32 and the formation 31 extends at a divergent angle to the mating tongue 32, as shown in FIGURE 4. The mating tongue 32 has a flat outer surface 33 which terminates in a sear shoulder 34 and a bevelled inner surface 35.

This form of the invention is assembled in the same manner as the form of the invention shown in FIGURES 1 to 3 inclusive, with the bevelled surface 25 of the lip 24 engaging the bevelled surface 35 of the tongue 32 as it enters the kerf 30. The tongue 32 being forced into the kerf 30 until the catches 29 engage the sear shoulder 34. An interference fit will therefore be obtained between the bevelled surfaces 25 and 35 to form a seal for the joint. The engagement of the catches 29 with the sear shoulder 34 securely fastens the formation 31 to the pressure vessel or motor case body 23 as previously described.

Figure 5:
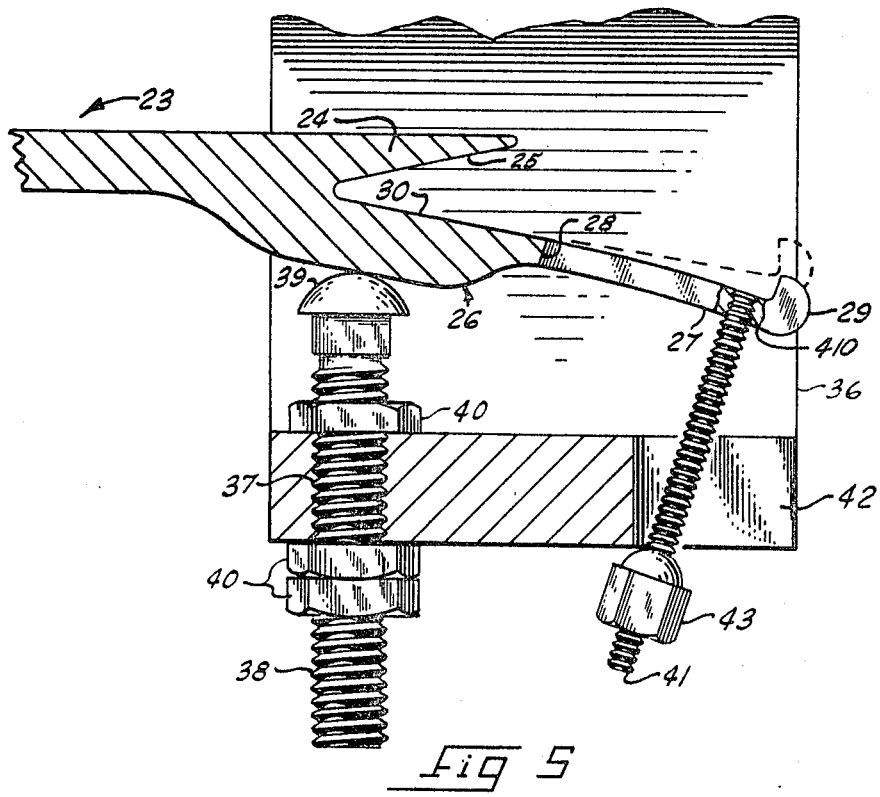
FIGURE 5 is a fragmentary sectional view showing how the forms of FIGURE 1 and FIGURE 4 may be alternately assembled.

In FIGURE 5 for the purpose of illustration, the form of the invention shown in FIGURE 4 will be utilized with the pressure vessel or motor case body 23 being included with its component parts, as previously described.

If the elasticity of the material from which the pressure vessel or motor case body 23 is formed is not sufficient to provide sufficient flexibility in the segments 27 to pass or clear the sear 21 or sear shoulder 34, a tooling ring 36 having a greater diameter than the pressure vessel or motor case body 23 is positioned in circumjacent relation to the pressure vessel or motor case body 23, as shown in FIGURE 5.

The tooling ring 36 is provided with a threaded bore 37 adjacent one periphery thereof and a threaded screw bolt 38, having an enlarged rounded head 39, is threaded into the bore 37 so that the head 39 will contact and engage the outer surface of the latch 26 in alignment with the kerf 30. Lock nuts 40, threaded onto the screw bolt 38 on opposite surfaces of the tooling ring 36 will rigidly retain the screw bolt 38 in adjusted relation to the tooling ring 36 as desired. A threaded bore 410 is also provided in the outer end of each of the segments 27 inwardly of the catch 29 and a threaded tension screw bolt 41 is adapted to be threaded into the bore 410 in the segment 27 for a purpose to be later described. The screw bolt 41 extends through an open ended slot 42 that is positioned in the opposite periphery of the tooling ring 36 and a tension nut 43 is threaded onto the screw bolt 41 and engages that portion of the outer surface of the tooling ring 36 that defines the slot 42.

If it is desired to reduce the amount of longitudinal joining force that is required to form the joint or the elasticity of the latch 26 is not sufficient to permit the expansion of the latch 26, the screw bolt 41 is threaded into the threaded bore 410 in the segment 27 and using the head 39 of the bolt 38 as a fulcrum centering or orienting point, radial force is applied to the latch 26 by wrenching the tension nut 43 on the screw bolt 41 to expand each of the segments 27, it being understood that there is a bolt 38 and a bolt 41 for each of the segments 27 that are provided in the latch 26. When the catches 29 are in position to engage the sear shoulder 34 or the catches 16 to engage the sear 21, the tension nuts 43 are backed off of the screw bolts 41 and the latches 26 are then permitted to assume their normal unstressed shape, thus, rigidly securing the pressure vessel or motor case body to the formation in either form of the invention.

In FIGURE 6 the pressure vessel or motor case body 44 is provided with a contiguous mating lip 45, which is bevelled as at 46. A mating latch 47 is also formed on the pressure vessel or motor case body 44 and is contiguous therewith and extends beyond the edge of the lip 45. The latch 47 is divided into segments 48 by a plurality of slits 49 and the upper surface adjacent the outer edge of each segment is provided with a plurality of serrations or catches 50 and the latch 47 is separated from the lip 45 by a bevelled kerf 51.

The formation 52 is provided with a mating tongue 53 that is contiguous with the formation 52 and has a bevelled inner surface 54 and a bevelled outer surface 55. The bevelled outer surface 55 is provided at the outer edge thereof with a plurality of serrations or sears 56 which are adapted to coact with the catches 50 on the latch 47 as the joint is assembled.

The assembly of this form of the invention must be accomplished by the use of the tooling ring 36 and its component parts, as shown in FIGURE 5.

Thus, the bevelled surface 46 of the lip 45 will engage the bevelled surface 54 of the tongue 53 as the tongue 53 is inserted into the kerf 51, after tension has been relieved on the latch 47, the bevelled surface 46 of the lip 45 will engage the bevelled surface 54 of the tongue 53 to provide an interference fit and thus provide or form a seal for the joint. The engagement of the sears 56 with the catches 50, securely fasten the formation 52 to the pressure vessel or motor case body 44, as previously described.

In FIGURE 7 the pressure vessel or motor case body 57 is provided with a contiguous mating lip 58, which is bevelled as at 59. A mating latch 60 is also formed on the pressure vessel or motor case body 57 and is contiguous therewith and extends beyond the edge of the lip 58. The latch 60 is divided into segments 61 by a plurality of slits 62 and the outer edge of each of the segments 61 is provided with an inturned catch 63 and the latch 60 is separated from the lip 58 by a bevelled kerf 64.

The formation 65 is provided with a mating tongue 66 that is contiguous with the formation 65 and has a bevelled inner surface 67 and a bevelled outer surface 68 which terminates in a sear 69.

This form of the invention is assembled in the same manner as the forms of the invention shown in FIGURES 1 to 4 inclusive, with the bevelled surface 59 of the lip 58 engaging the bevelled surface 68 of the tongue 66 as it enters the kerf 51. The tongue 66 being forced into the kerf 51 until the catches 63 engage the sear 69. An interefrence fit will therefore be obtained between the bevelled surfaces 59 and 67 to form a seal for the joint. The engagement of the catches 63 with the sear 69 securely fasten the formation 65 to the pressure vessel or motor case body 57, as previously described.

There are times, however, when the pressure in the pressure vessel or motor case body is excessive and to properly insure that the joint will withstand such excessive pressure, a fastening means 70 will be threaded through an opening 71 in each of the segments 61 to be received in a threaded socket 72 in the tongue 66 of the formation 65 adjacent to and forward of the sear 69 formed thereon. Except, therefore( for the use of the fastening means 71, this form of the invention is similar to the forms of the invention shown in FIGURES 1 to 4 inclusive.

In FIGURE 8, the pressure vessel or motor case body 73 is provided with a contiguous mating lip 74 which is bevelled as at 75. A mating latch 76 is also formed on the pressure vessel or motor case body 73 and is contiguous therewith and extends beyond the edge of the lip 74. The latch 76 is divided into segments 77 by a plurality of slits 78 and the outer edge of each of the segments 77 is provided with an inturned catch 79 and the latch 76 is separated from the lip 74 by a bevelled kert 80.

The formation 81 is provided with a mating tongue 82 that is contiguous with the formation 81 and has a bevelled inner surface 83 and a bevelled outer surface 84 which terminates in a sear 85.

This form of the invention is assembled in the same manner as the forms of the invention shown in FIGURES 1 to 4 inclusive, and FIGURE 7 with the bevelled surface 75 of the lip 74 engaging the bevelled surface 83 of the tongue 82 as it enters the kerf 80. The tongue 82 being forced into the kerf 80 until the catches 79 engage the sear 85. An interference fit will therefore be obtained between the bevelled surfaces 75 and 83 to form a seal for the joint. Then engagement of the catches 79 with the sear 85 securely fastening the formation 81 with the pressure vessel or motor case body 73, as previously described.

As previously described for FIGURE 7, wherein a fastening means 70 is utilized, a swege band 86 is positioned on the segments 77 in circumjacent relation thereto and the band 86 will retain the catches 79 in engagement with the sear 85 regardless of the pressure to which the joint may be subjected. Except, therefore, for the use of the swege band 86, this form of the invention is similar to the forms of the invention shown in FIGURES 1 to 4 inclusive.

The assembly of the joint has been minutely described as to FIGURES 1 to 3 inclusive, and it is to be understood that such description will apply to all forms of the invention, it also being understood that the tooling ring 36 and its component parts may be used as desired with all forms of the invention.

Having thus described the invention what is claimed as new and desired to be secured by Letters Patent is:

1. A joint comprising a first part and a second part for connecting a pressure vessel to a mating formation, said first part of the joint being contiguous with the wall of the pressure vessel and comprising a lip portion and a latch portion, a kerf separating said lip portion from said latch portion and the outer edge of said latch portion extending beyond the outer edge of said lip portion, said latch portion having a plurality of longitudinally extending slits forming a plurality of segments therein, each of said segments having a catch on the outer end thereof, said second part of said joint being contiguous with the wall of said formation and comprising a tongue portion, a sear portion formed on the lower surface of said tongue portion, a tooling ring having a greater diameter than said first or second parts positioned in circumjacent relation to one of said parts, a fulcrum screw bolt threaded into said ring for engagement with said latch portion, a threaded bore in each of said segments adjacent the catch thereon, a slot in said ring, a second screw bolt inserted through said slot to be engaged in the threaded bore in each of said segments and a tension nut threaded onto said second screw bolt outwardly of said tooling ring whereby when said tension nut is manipulated said latch portion is moved outwardly so that said tongue portion may be inserted into said kerf until the catches on said segments can engage said sear portion to securely fasten said pressure vessel to said formation.

References Cited

UNITED STATES PATENTS

| | | | |
|---|---|---|---|
| 643,358 | 2/1900 | Konold | 285—331 X |
| 798,795 | 9/1905 | Itrich et al. | 285—319 X |
| 937,437 | 10/1909 | Halstead et al. | 285—319 X |
| 2,525,652 | 10/1950 | Cuningham | 285—404 X |
| 3,087,746 | 4/1963 | Hamilton et al. | 285—243 |
| 3,100,121 | 8/1963 | Hillmer | 285—321 |
| 3,338,596 | 8/1967 | Knox | 285—351 |

FOREIGN PATENTS

| | | |
|---|---|---|
| 1,310,713 | 10/1962 | France. |
| 204,854 | 5/1966 | Sweden. |

CARL W. TOMLIN, Primary Examiner

D. W. AROLA, Assistant Examiner

U.S. Cl. X.R.

285—90, 308, 319, 331